United States Patent [19]

Jackson, Jr. et al.

[11] 4,360,658
[45] Nov. 23, 1982

[54] COPOLYESTER DERIVED FROM TEREPHTHALIC ACID, PHENYLHYDROQUINONE AND HYDROQUINONE

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 237,173

[22] Filed: Feb. 23, 1981

Related U.S. Application Data

[63] Continuation-in-part of Ser. No. 95,279, Nov. 19, 1979, abandoned.

[51] Int. Cl.$^3$ .............................................. C08G 63/18
[52] U.S. Cl. .................................... 528/193; 528/271
[58] Field of Search ............... 528/190, 191, 193, 194, 528/271, 309

[56] References Cited

U.S. PATENT DOCUMENTS

| | | | |
|---|---|---|---|
| 4,064,108 | 12/1977 | Inata et al. ......................... | 528/193 |
| 4,153,779 | 5/1979 | Jackson, Jr. et al. ............... | 528/193 |
| 4,159,365 | 6/1979 | Payet .................................. | 428/364 |
| 4,238,600 | 12/1980 | Jackson, Jr. et al. ............... | 528/193 |

*Primary Examiner*—Lester L. Lee
*Attorney, Agent, or Firm*—William P. Heath, Jr.; Daniel B. Reece, III

[57] ABSTRACT

Copolyesters of terephthalic acid, phenylhydroquinone and 25 to 50 mole percent hydroquinone based on total moles of diol. These copolyesters are characterized by unexpected chemical resistance.

4 Claims, No Drawings

COPOLYESTER DERIVED FROM TEREPHTHALIC ACID, PHENYLHYDROQUINONE AND HYDROQUINONE

This application is a continuation-in-part of our Application Ser. No. 95,279 filed Nov. 19, 1979, now abandoned.

DESCRIPTION

TECHNICAL FIELD

Our invention is a new high molecular weight copolymer of terephthalic acid, phenylhydroquinone and hydroquinone in which the ratio of phenylhydroquinone to hydroquinone components is critical. Copolymers within this critical range are characterized by good melt processability, high heat resistance, high oxidative stability and high chemical resistance. The copolyesters are valuable for the manufacture of plastics, fibers, films and other shaped objects with high properties.

BACKGROUND ART

U.S. Pat. No. 4,159,365 discloses copolyesters of phenylhydroquinone and terephthalic acid containing up to 10 mole percent (based on the total moles of units) of other aromatic or cycloaliphatic polyester-forming units, including hydroquinone. Ten mole percent of the "other aromatic polyester-forming units" above, if an aromatic diol, corresponds to 20 mole percent based on the total moles of aromatic diols combined. In column 2, lines 29-31, the above patent teaches: "The presence of comonomer units depresses the melting point as would be expected." The copolyesters of this invention prepared from terephthalic acid, 50 to 75 mole percent of a diacyl ester of phenylhydroquinone, and 25 to 50 mole percent of a diacyl ester of hydroquinone melt similar to or higher than the homopolymer prepared from terephthalic acid and a diacyl ester of phenylhydroquinone. In addition copolyesters of this invention have unexpected chemical resistance.

U.S. Pat. No. 3,160,602 discloses a process for the preparation of aromatic polyesters from dihydric phenols and aromatic carbonyl halides while dissolved in certain solvents. The use of phenylhydroquinone is disclosed (column 6, line 12), but there is no disclosure concerning which of the numerous copolyesters can be prepared which are sufficiently soluble in the solvents for useful molecular weights to be attained.

U.S. Pat. No. 4,153,779 discloses somewhat similar copolyesters prepared with substituted phenylhydroquinones. The halogen and alkyl substituents reduce the stability of those polymers in an oven at 260° C., however, whereas the copolyesters of this invention have superior stability (films remain tough appreciably longer when heated in an oven at 260° C.).

DISCLOSURE OF INVENTION

This invention is a class of novel copolyesters containing the following divalent radicals:

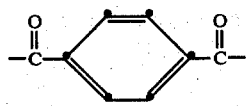  A.

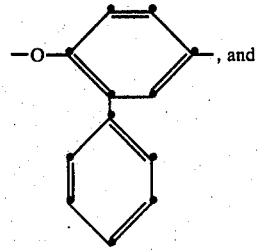  B.

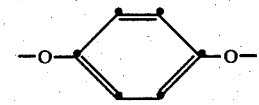  C.

wherein (B) is present in the amount of 50 to 75 mole percent and (C) is present in the amount of 25 to 50 mole percent based on total moles of (B) and (C).

The diacyl derivative of the hydroquinone used in this invention is made by known methods employing lower acyl halides or anhydrides containing 2 to 8 carbon atoms in the acyl group. The acetyl and propionyl derivatives are preferred, but the butyryl, isobutyryl or benzoyl derivatives are examples of others which may also be used.

Up to 20 mole percent of aromatic dicarboxylic acids other than terephthalic acid may be used in the preparation of the polymers of this invention provided the properties are not substantially altered. Examples of such acids are 2,6-naphthalenedicarboxylic acid, 4,4'-oxydibenzoic acid, monochloroterephthalic acid, dichloroterephthalic acid, methylterephthalic acid, dimethylterephthalic acid, 4,4'-diphenyldicarboxylic acid, isophthalic acid, or methylisophthalic acid. Preferably terephthalic acid is the only acid used.

The copolymers of the invention are made by conventional techniques, such as by acidolysis of phenylhydroquinone diacetate and hydroquinone diacetate with terephthalic acid. The reactants are heated at about 300° C. until most of the monocarboxylic acid has evolved. The temperature of the melt is then increased to about 380°-390° C., a vacuum of about 0.5 millimeter is applied and stirring is continued until a high melt viscosity polymer is obtained. If the polymer solidifies, its molecular weight may be increased to a sufficient value by heating particles of the polymer in an inert atmosphere or under reduced pressure at a temperature just below the softening point of the polymer. The molecular weights are high enough to be fiber-forming. Higher tenacities can be obtained by heating melt-spun fibers in an inert atmosphere or under reduced pressure at 300°-330° C. for several hours.

Tough films are obtained by pressing or by extrusion. Molding plastics having very high tensile strength, modulus and heat deflection temperatures are obtained by injection-molding at about 360°-400° C.

In addition to exhibiting melt processability and heat resistance, the copolymers of this invention have unexpected chemical resistance.

The following table summarizes the melting points and chemical resistance data of pressed, quenched films (5 to 7 mils thick) of poly(phenyl-1,4-phenylene terephthalate) modified with 0, 20, 25, 30, 35, 40, and 50 mole percent hydroquinone and exemplifies the unexpected chemical resistance. The solubility was determined by stirring the films in a 60/40 (by weight) solution of phenol/tetrachloroethane at 100° C. for one hour. The solubility of the films was also determined in an even more potent solvent, 65/35 (by volume) solution of methylene chloride/trifluoroacetic acid, at room temperature.

| Hydroquinone, Mole Percent | Melting Point, °C.[a] | Solubility | |
| --- | --- | --- | --- |
| | | 60/40 Phenol/ Tetrachloroethane[b] | 65/35 Methylene Chloride/ Trifluoroacetic Acid[c] |
| 0 | 340 | Soluble | Soluble |
| 20 | 330 | Soluble | Soluble |
| 25 | 330 | Insoluble | Soluble |
| 30 | 333 | Insoluble | Soluble |
| 35 | 359 | Insoluble | Partially soluble |
| 40 | 372 | Insoluble | Insoluble |
| 50 | 420 | Insoluble | Insoluble |

[a]determined with a Perkins-Elmer DSC-2 differential scanning calorimeter
[b]determined at 100° C.
[c]determined at 25° C.

In addition to plastics, films and fibers, the copolymers of this invention may be fabricated to give other types of shaped objects, such as foamed plastics, extruded shapes and coatings. The compositions of this invention also may contain nucleating agents, pigments, glass fibers, asbestos fibers, antioxidants, stabilizers, plasticizers, lubricants and other additives.

The following examples are submitted for a better understanding of the invention.

EXAMPLE 1

This example illustrates the preparation of a copolyester from terephthalic acid, 30 mole percent hydroquinone dipropionate and 70 mole percent 2-phenylhydroquinone dipropionate. A mixture of 11.6 g. (0.70 mole) terephthalic acid, 4.7 g. (0.021 mole) hydroquinone dipropionate and 14.6 g (0.049 mole) phenylhydroquinone dipropionate is placed in a 100 ml. flask equipped with a stirrer, a short distillation column and an inlet for nitrogen. The flask is evacuated and purged three times with nitrogen before being lowered into a Wood's metal bath maintained at 140° C. The mixture is heated under a nitrogen atmosphere with stirring to a temperature of 295° C. at which point propionic acid begins to distill rapidly from the flask. After the reaction mixture is heated with stirring at this temperature for 90 minutes, the temperature of the bath is increased to 360° C. A vacuum of 0.5 millimeter of mercury is then applied over a period of 5 minutes. After stirring is continued under 0.5 millimeter of mercury at 360° C. for 5 minutes, a medium melt viscosity, opaque, light tan polymer is obtained. The polymer has a crystalline melting point at 333° C. and an inherent viscosity of 1.9. Fibers melt spun from this polymer at 370° C. are heated in a nitrogen atmosphere at 125° C. for 1 hour, heated to 360° C. over a period of 45 minutes and then heated at 360° C. for 15 minutes. The fibers have the following properties: 2.6 denier per filament, tenacity 17.3 grams per denier, elongation 3.2% and elastic modulus 730 grams per denier.

EXAMPLE 2

A copolymer is prepared with 0.50 mole (100 mole percent) terephthalic acid, 0.20 mole (40 mole percent) hydroquinone dipropionate and 0.30 mole (60 mole percent) phenylhydroquinone dipropionate by the procedure of Example 1, except the maximum temperature is 395° C. A light tan, opaque, fibrous polymer is obtained. The polymer has a crystalline melting point of 372° C.

The polymer is ground to pass a 20 mesh screen for subsequent solid-state polymerization. Solid-state polymerization of the polymer is accomplished by heating the particles under reduced pressure (0.1 mm Hg) at 300° C. for 2 hours and 320° C. for 4 hours.

Bars molded at 400° C. from this polymer are smooth and tough. Tensile bars (2½ × ⅜ × 1/16 inch) have a tensile strength of 31,900 psi.

EXAMPLE 3

This example illustrates the preparation of a copolyester using 25 mole percent of hydroquinone. A copolymer is prepared with 0.10 mole (100 mole percent) terephthalic acid, 0.025 mole (25 mole percent) hydroquinone dipropionate, and 0.075 mole (75 mole percent) phenylhydroquinone dipropionate by the procedure of Example 1. A light tan, opaque, fibrous polymer is obtained. The polymer has an inherent viscosity of 2.5 and a crystalline melting point of 330° C. A 10 mil film pressed at 360° C. is tough and flexible.

The invention has been described in detail with particular reference to certain preferred embodiments thereof, but it will be understood that variations and modifications can be effected within the spirit and scope of the invention.

We claim:

1. Copolyester having a film- and fiber-forming molecular weight consisting essentially of the following divalent radicals

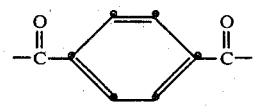
A.

B.
, and

C.

wherein (B) is present in the amount of 50 to 75 mole percent and (C) is present in the amount of 25 to 50 mole percent based on total moles of (B) and (C).

2. Copolyester of claim 1 wherein (B) is present in the amount of 65 to 60 mole percent and (C) is present in the amount of 35 to 40 mole percent based on (B) and (C).

3. Shaped article of a copolyester of claim 1.

4. Shaped article of a copolyester of claim 2.

* * * * *

UNITED STATES PATENT AND TRADEMARK OFFICE
CERTIFICATE OF CORRECTION

PATENT NO. : 4,360,658
DATED : November 23, 1982
INVENTOR(S) : Jackson et al

It is certified that error appears in the above—identified patent and that said Letters Patent is hereby corrected as shown below:

Column 2 lines 3 through 12, change

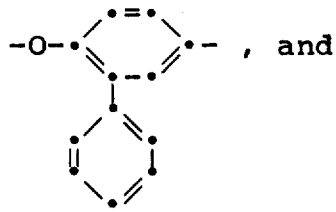 , and to read

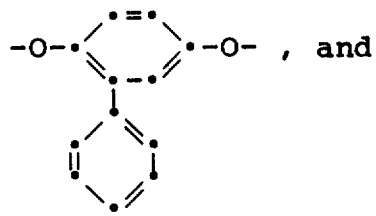 , and

UNITED STATES PATENT AND TRADEMARK OFFICE
CERTIFICATE OF CORRECTION

PATENT NO. : 4,360,658

DATED : November 23, 1982

INVENTOR(S) : Jackson et al

It is certified that error appears in the above—identified patent and that said Letters Patent is hereby corrected as shown below:

Column 4 Claim 1 lines 42 through 52 change

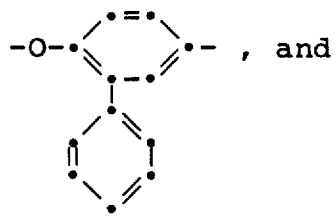, and to read

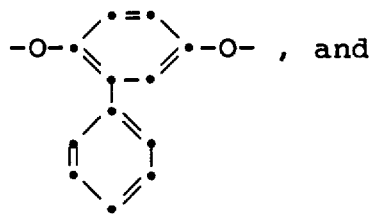, and

Signed and Sealed this

Fifteenth Day of February 1983

[SEAL]

Attest:

GERALD J. MOSSINGHOFF

Attesting Officer   Commissioner of Patents and Trademarks